US012591433B2

(12) United States Patent
Durbhakula et al.

(10) Patent No.: US 12,591,433 B2
(45) Date of Patent: Mar. 31, 2026

(54) COMPILER ALGORITHM FOR GPU PREFETCHING

(71) Applicant: QUALCOMM Incorporated, San Diego, CA (US)

(72) Inventors: Suryanarayana Murthy Durbhakula, Hyderabad (IN); Adarsh Golikeri, Bengaluru (IN); Siva Rama Krishna Reddy Bogi Reddy, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 18/500,879

(22) Filed: Nov. 2, 2023

(65) Prior Publication Data

US 2025/0147766 A1 May 8, 2025

(51) Int. Cl.
*G06F 11/3668* (2025.01)
*G06F 9/38* (2018.01)

(52) U.S. Cl.
CPC .......... *G06F 9/3816* (2013.01); *G06F 9/3877* (2013.01)

(58) Field of Classification Search
CPC .................................................. G06F 11/3668
See application file for complete search history.

(56) References Cited

U.S. PATENT DOCUMENTS

| | | | |
|---|---|---|---|
| 2013/0159630 A1* | 6/2013 | Lichmanov ......... | G06F 12/0888 711/E12.07 |
| 2014/0092102 A1* | 4/2014 | Sigg ....................... | G06T 17/00 703/2 |
| 2015/0067278 A1* | 3/2015 | Gurumurthi ........ | G06F 12/0811 711/154 |
| 2015/0220335 A1* | 8/2015 | Mitra ................... | G06F 11/3409 717/120 |
| 2015/0286472 A1* | 10/2015 | Lim ..................... | G06F 9/45516 717/151 |

FOREIGN PATENT DOCUMENTS

WO        WO-2019236604 A1 * 12/2019 ......... G01D 5/35316

* cited by examiner

*Primary Examiner* — Jae U Jeon
(74) *Attorney, Agent, or Firm* — Loza & Loza LLP

(57) ABSTRACT

Aspects of the disclosure are directed to processor prefetching. In accordance with one aspect, processor prefetching includes determining if an exposed latency parameter is greater than zero; determining if a loop is present in a program code; determining if access overlap across fibers is true; and performing one of the following: a) insert a prefetch every quantity K fibers at a prefetch distance D; b) insert a prefetch every quantity K fibers with a maximum of quantity N iterations; or c) insert a prefetch per fiber with a maximum of quantity N iterations ahead; and wherein, the prefetch distance D is equal to an exposed latency parameter divided by an average instruction latency parameter, the quantity K is equal to a cache line size divided by a per fiber access size, and the quantity N is equal to an exposed latency parameter divided by an average iteration latency parameter.

9 Claims, 7 Drawing Sheets

FIG 3.

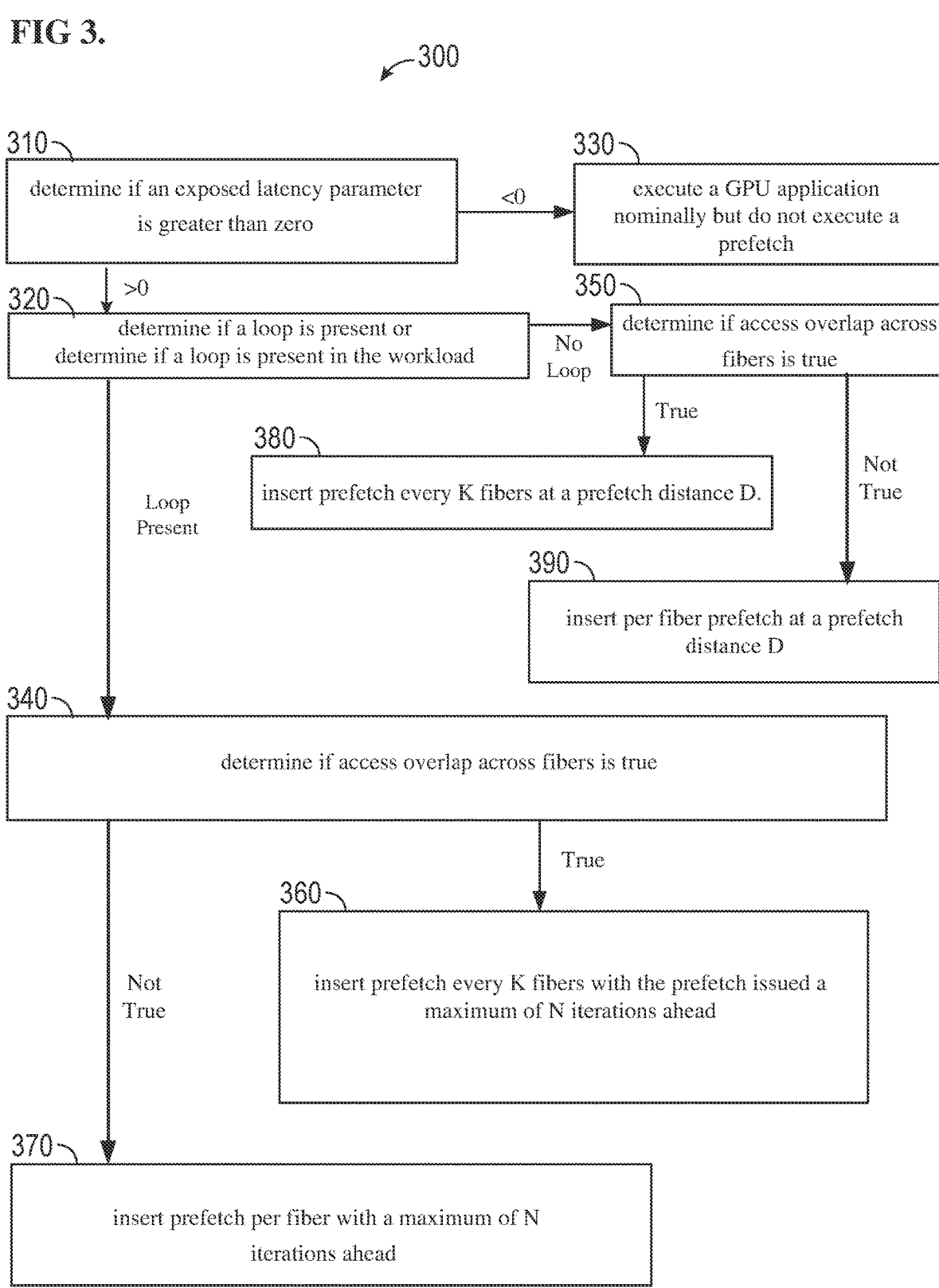

300

310 — determine if an exposed latency parameter is greater than zero

<0

330 — execute a GPU application nominally but do not execute a prefetch

>0

320 — determine if a loop is present or determine if a loop is present in the workload No Loop 350 — determine if access overlap across fibers is true True 380 — insert prefetch every K fibers at a prefetch distance D.

Not True

390 — insert per fiber prefetch at a prefetch distance D

Loop Present

340 — determine if access overlap across fibers is true

True

360 — insert prefetch every K fibers with the prefetch issued a maximum of N iterations ahead Not True 370 — insert prefetch per fiber with a maximum of N iterations ahead

Figure 6:
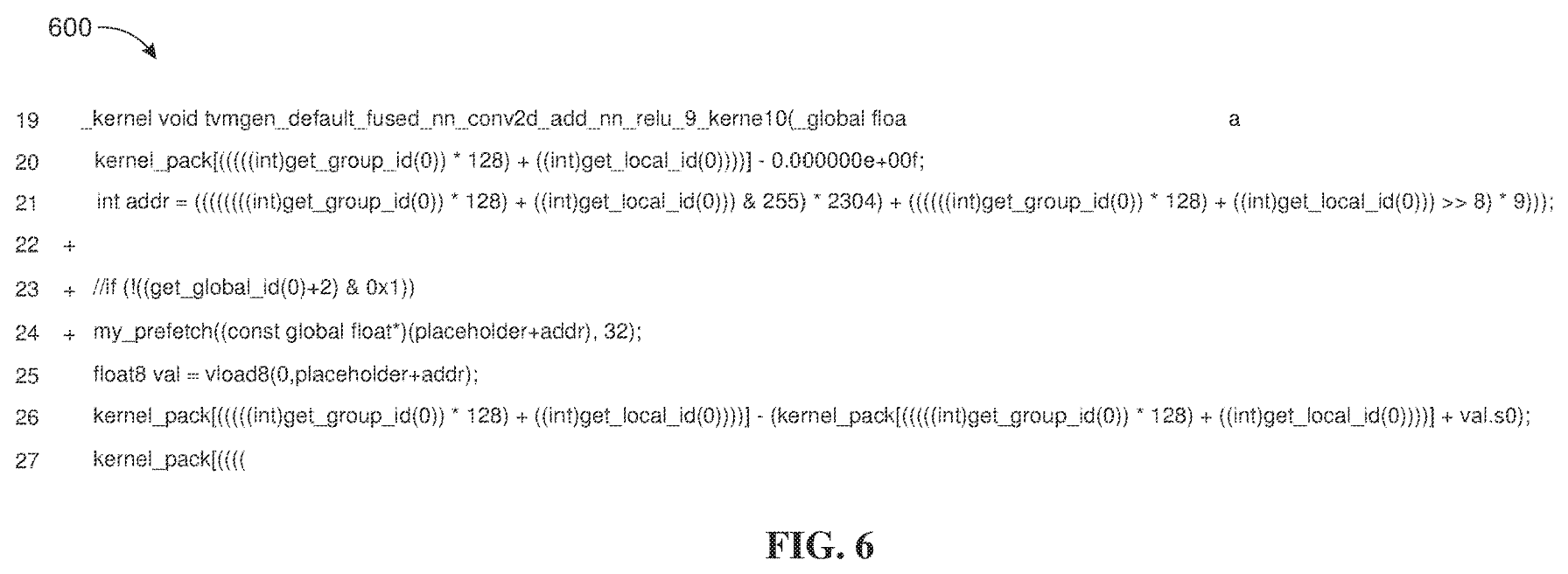

600

```
19    __kernel void tvmgen_default_fused_nn_conv2d_add_nn_relu_9_kerne10(__global floa      a 20    kernel_pack[((((((int)get_group_id(0)) * 128) + ((int)get_local_id(0))))] - 0.000000e+00f;

21    int addr = (((((((int)get_group_id(0)) * 128) + ((int)get_local_id(0))) & 255) * 2304) + (((((((int)get_group_id(0)) * 128) + ((int)get_local_id(0))) >> 8) * 9)));

22 +
23 +  //if (!((get_global_id(0)+2) & 0x1))
24 +  my_prefetch((const global float*)(placeholder+addr), 32);
25 +  float8 val = vload8(0,placeholder+addr);
26    kernel_pack[((((((int)get_group_id(0)) * 128) + ((int)get_local_id(0))))] - (kernel_pack[((((((int)get_group_id(0)) * 128) + ((int)get_local_id(0))))] + val.s0);
27    kernel_pack[((((
```

Figure 7:
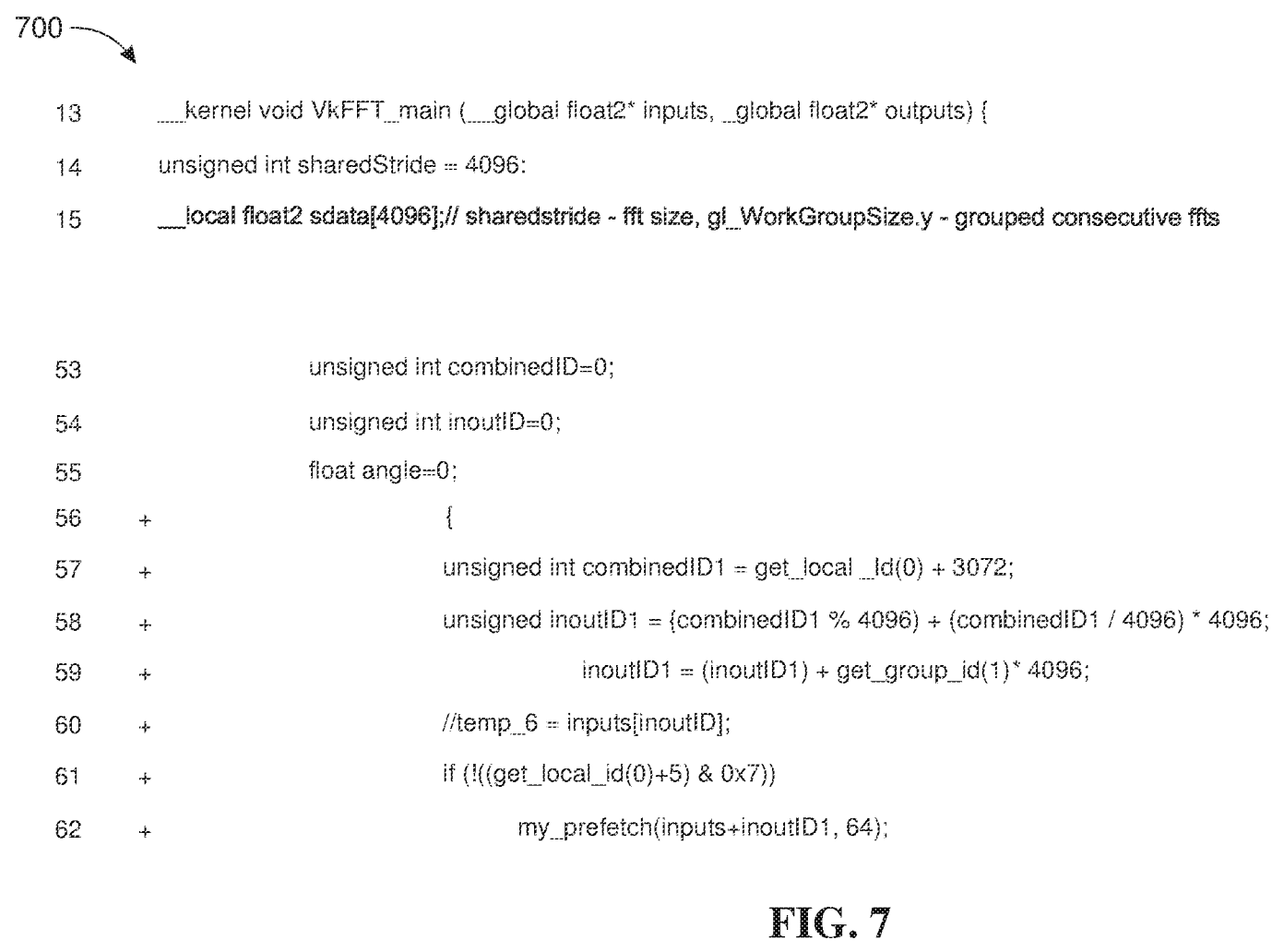

```
13    __kernel void VkFFT_main (__global float2* inputs, __global float2* outputs) {

14    unsigned int sharedStride = 4096;

15    __local float2 sdata[4096];// sharedstride ~ fft size, gl_WorkGroupSize.y ~ grouped consecutive ffts 53    unsigned int combinedID=0;

54    unsigned int inoutID=0;

55    float angle=0;

56  +    {

57  +    unsigned int combinedID1 = get_local_id(0) + 3072;

58  +    unsigned int inoutID1 = (combinedID1 % 4096) + (combinedID1 / 4096) * 4096;

inoutID1 = (inoutID1) + get_group_id(1)* 4096;

59  +    inoutID1 = (inoutID1) + get_group_id(1)* 4096;

60  +    //temp_6 = inputs[inoutID];

61  +    if (!((get_local_id(0)+5) & 0x7))

62  +    my_prefetch(inputs+inoutID1, 64);
```

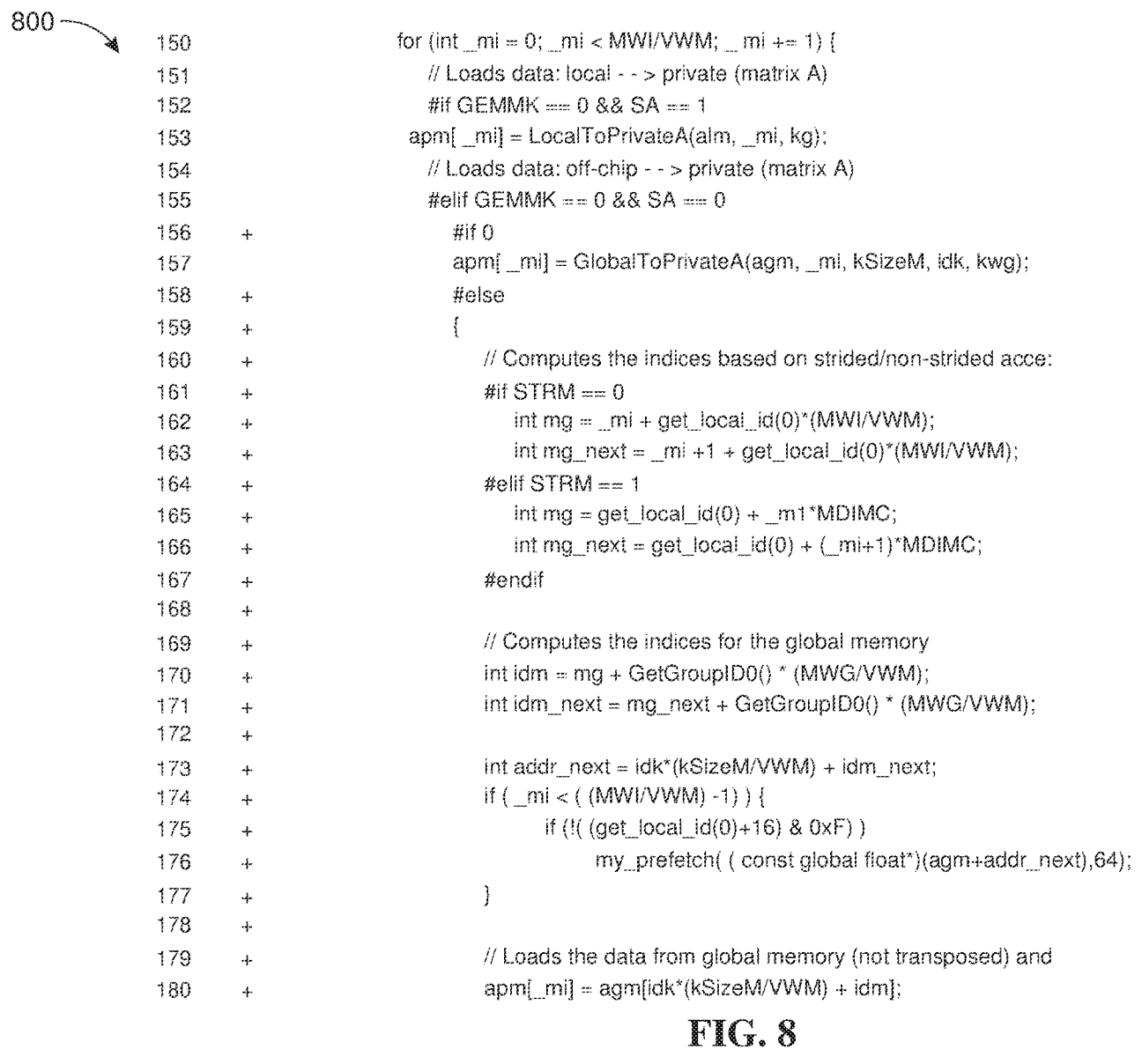

```
150  for (int _mi = 0; _mi < MWI/VWM; _mi += 1) {
151      // Loads data: local - -> private (matrix A)
152  +   #if GEMMK == 0 && SA == 1
153  +   apm[_mi] = LocalToPrivateA(alm, _mi, kg);
154      // Loads data: off-chip - -> private (matrix A)
155  +   #elif GEMMK == 0 && SA == 0
156  +       #if 0
157  +       apm[_mi] = GlobalToPrivateA(agm, _mi, kSizeM, idk, kwg);
158  +       #else
159  +       {
160  +           // Computes the indices based on strided/non-strided acce:
161  +           #if STRM == 0
162  +           int mg = _mi + get_local_id(0)*(MWI/VWM);
163  +           int mg_next = _mi +1 + get_local_id(0)*(MWI/VWM);
164  +           #elif STRM == 1
165  +           int mg = get_local_id(0) + _mi*MDIMC;
166  +           int mg_next = get_local_id(0) + (_mi+1)*MDIMC;
167  +           #endif
168
169  +           // Computes the indices for the global memory
170  +           int idm = mg + GetGroupID0() * (MWG/VWM);
171  +           int idm_next = mg_next + GetGroupID0() * (MWG/VWM);
172
173  +           int addr_next = idk*(kSizeM/VWM) + idm_next;
174  +           if ( _mi < ( (MWI/VWM) -1) ) {
175  +               if (!( (get_local_id(0)+16) & 0xF) )
176  +                   my_prefetch(( const global float*)(agm+addr_next),64);
177  +           }
178  +
179          // Loads the data from global memory (not transposed) and
180  +       apm[_mi] = agm[idk*(kSizeM/VWM) + idm];
```

FIG. 8

COMPILER ALGORITHM FOR GPU PREFETCHING

TECHNICAL FIELD

This disclosure relates generally to the field of compiler algorithm, and, in particular, to compiler algorithm for software prefetching.

BACKGROUND

An information processing system, for example, a computing platform, aims to maximize processing throughput, that is, the number of processing operations per unit time. One approach for improving processing throughput attempts to minimize processing latency (i.e., delay in fetching and executing processing operations). Hence, for certain processors, such as a graphical processing unit (GPU), processor performance may be improved by data prefetching from main memory prior to execution time.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides processor prefetching. Accordingly, an apparatus including: a layer 1 (L1) cache memory unit; a layer 2 (L2) cache memory unit coupled to the layer 1 (L1) cache memory unit, wherein the layer 2 (L2) cache memory unit has a slower memory access and a larger memory capacity than the layer 1 (L1) cache memory unit; and a graphical processing unit (GPU) coupled to the layer 1 (L1) cache memory unit and the layer 2 (L2) cache memory unit, the GPU configured to perform the following: a) determine if an exposed latency parameter is greater than zero; b) determine if a loop is present in a program code; and c) determine if access overlap across fibers is true.

In one example, the GPU is further configured to insert a prefetch every quantity K fibers at a prefetch distance D. In one example, the prefetch distance D is equal to an exposed latency parameter divided by an average instruction latency parameter, and the quantity K is equal to a cache line size divided by a per fiber access size.

In one example, the GPU is further configured to insert prefetch every K fibers with a maximum of N iterations ahead. In one example, the quantity N is equal to an exposed latency parameter divided by an average iteration latency parameter, and the quantity K is equal to a cache line size divided by a per fiber access size. In one example, the GPU is further configured to insert prefetch per fiber with a maximum of quantity N iterations ahead. In one example, the quantity N is equal to an exposed latency parameter divided by an average iteration latency parameter.

Another aspect of the disclosure provides a method including: determining if an exposed latency parameter is greater than zero; and determining if a loop is present in a program code. In one example, the method further includes determining that the exposed latency parameter is greater than zero. In one example, the method further includes determining if access overlap across fibers is true. In one example, the loop is present. In one example, the method further includes inserting a prefetch per fiber with a maximum of quantity N iterations ahead. In one example, the access overlap across fibers is not true. In one example, the access overlap across fibers is true.

In one example, the method further includes inserting a prefetch every quantity K fibers with a maximum of quantity N iterations. In one example, the quantity N is equal to an exposed latency parameter divided by an average iteration latency parameter. In one example, the quantity K is equal to a cache line size divided by a per fiber access size. In one example, the loop is not present. In one example, the method further includes determining if access overlap across fibers is true. In one example, the access overlap across fibers is true.

In one example, the method further includes inserting a prefetch every quantity K fibers at a prefetch distance D. In one example, the prefetch distance D is equal to an exposed latency parameter divided by an average instruction latency parameter. In one example, the quantity K is equal to a cache line size divided by a per fiber access size. In one example, the access overlap across fibers is not true. In one example, the method further includes inserting a per fiber prefetch at a prefetch distance D. In one example, the prefetch distance D is equal to an exposed latency parameter divided by an average instruction latency parameter.

Another aspect of the disclosure provides an apparatus including: means for determining if an exposed latency parameter is greater than zero; means for determining if a loop is present in a program code; and means for determining if access overlap across fibers is true. In one example, the apparatus further includes one of the following: a) means for inserting a prefetch every quantity K fibers at a prefetch distance D wherein, the prefetch distance D is equal to an exposed latency parameter divided by the average instruction latency parameter and the quantity K is equal to a cache line size divided by a per fiber access size; b) means for inserting a prefetch every quantity K fibers with a maximum of quantity N iterations, wherein the quantity N is equal to an exposed latency parameter divided by an average iteration latency parameter, and the quantity K is equal to a cache line size divided by a per fiber access size; or c) means for inserting a prefetch per fiber with a maximum of quantity N iterations ahead, wherein the quantity N is equal to an exposed latency parameter divided by the average iteration latency parameter.

Another aspect of the disclosure provides a non-transitory computer-readable medium storing computer executable code, operable on a device including at least one processor and at least one memory coupled to the at least one processor, wherein the at least one processor is configured to implement a processor prefetching, the computer executable code including: instructions for causing a computer to determine if an exposed latency parameter is greater than zero; instructions for causing the computer to determine if a loop is present in a program code; instructions for causing the computer to determine if access overlap across fibers is true; and instructions for causing the computer to perform one of the following: a) insert a prefetch every quantity K fibers at a prefetch distance D wherein, the prefetch distance D is equal to an exposed latency parameter divided by the average instruction latency parameter and the quantity K is equal to a cache line size divided by a per fiber access size; b) insert a prefetch every quantity K fibers with a maximum of quantity N iterations, wherein the quantity N is equal to an exposed latency parameter divided by an average iteration latency parameter, and the quantity K is equal to a cache line size divided by a per fiber access size; or c) insert a prefetch per fiber with a maximum of quantity N iterations ahead, wherein the quantity N is equal to an exposed latency parameter divided by the average iteration latency parameter.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 3 illustrates an example flow diagram for processor prefetching.

FIG. 6 illustrates a first example of a program code without a loop present and without access overlap across fibers.

FIG. 7 illustrates a second example of a program code without a loop present and with access overlap across fibers.

FIG. 8 illustrates a third example of a program code with a loop present and with access overlap across fibers.

DETAILED DESCRIPTION

Figure 1:
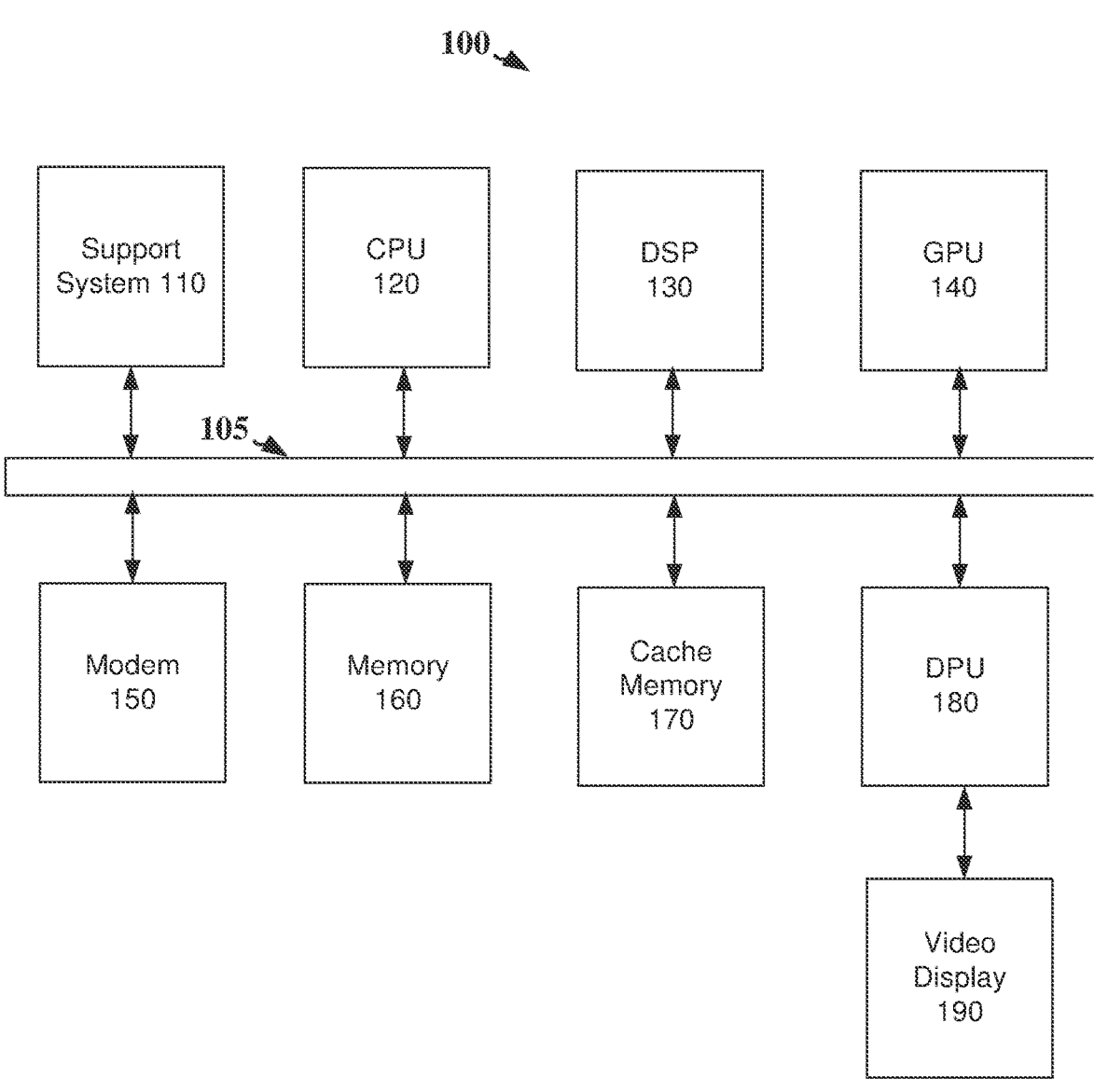
FIG. 1 illustrates an example information processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, processing operations in an information processing system require retrieval of data and instructions from memory for execution. For example, data and instructions may be stored in a memory within a memory hierarchy which has different memory types with various performance attributes. For example, one memory type may have very fast access time (e.g., minimal latency) but limited storage capacity and another memory type may have slower access time (e.g., longer latency) but very large storage capacity. In one example, the memory hierarchy is designed to balance overall latency, storage capacity and cost. One type of memory which has very fast access time is a cache memory. For example, a cache memory may have a specialized interface with a processor to minimize data and instruction retrieval latency.

In one example, prior to execution of an instruction, data and instructions may be retrieved from main memory and placed into cache memory ahead of the time needed for execution. In one example, this operation is an example of prefetching; that is, retrieving information from main memory earlier than required for execution (i.e., ahead of demand access).

In one example, the information processing system may need to access data which is stored somewhere in the memory hierarchy. In one example, for fastest access, a memory read (i.e., a directive to retrieve requested data from memory) may be attempted first with a cache memory. For example, if the requested data is actually stored in the cache memory, this action is known as a cache memory hit or a memory hit (i.e., a hit). For example, if the requested data is not stored in the cache memory, this action is known as a cache memory miss or a memory miss (i.e., a miss) and the requested data must be retrieved from the main memory.

FIG. 1 illustrates an example information processing system 100. In one example, the information processing system 100 includes a plurality of processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory (i.e., a dedicated memory) which is not shared with the other processing engines.

In one example, high average memory latency may result in degraded performance. In one example, performance may be enhanced by applying prefetching for certain processors, such as the GPU 140 in the example information processing system 100.

In one example, in contrast to prefetching in the CPU 120, the GPU 140 may have a plurality of threads operating in parallel at the same time. A thread is a group of logically connected processing tasks. Parallel processing of the plurality of threads may involve both internal (i.e., dedicated) memory and shared memory. In one example, execution of the plurality of threads is initiated by the plurality of processing engines and includes read operations into shared memory and write operations into shared memory. For example, read operations retrieve data from shared memory locations and write operations store data into shared memory. In one example, management and control of the plurality of processing engines are performed in software by an operating system.

In one example, the GPU 140 may have a higher resource contention issue due to the plurality of threads. As a consequence, average memory latency may also be relatively higher and prefetching may be performed much earlier than demand access. In addition, for example, prefetching may be more accurate (i.e., retrieving data and instructions ahead of time that are actually needed) and bandwidth efficiency may improve to result in performance improvement.

In one example, GPU 140 constituents (e.g., fibers or threads) may perform cooperative prefetching where the plurality of threads synchronously fetch data and instructions from main memory to cache memory earlier than demand access. In one example, the GPU 140 executes operations according to a single instruction multiple thread (SIMT) programming model. In one example, the SIMT programming model implies parallel execution of a single instruction among a plurality of threads (vs. a multiple instruction multiple data (MIMD) programming model using by the CPU 120).

In one example, the cooperative prefetching by the GPU 140 constituents or by hardware accelerators may be used by a plurality of user applications, including artificial intelligence (AI) workloads.

In one example, a compiler is a specialized software program which translates a higher-level program code (e.g., source code) into a lower-level program code (e.g., object code) for execution. In one example, the compiler determines various parameters of the higher-level program code to produce an optimized or an efficient lower-level program code. For example, a compiler may be used for a GPU application where GPU source code is translated into GPU object code for execution.

In one example, the GPU 140 executes a plurality of instructions in parallel. In one example, a fiber is an atomic (e.g., smallest) parallel processing element of the GPU 140. In one example, each fiber executes one thread (e.g., independent processing task). In one example, a wave is a plurality of fibers which operate in parallel. That is, the GPU 140 may execute a plurality of waves in parallel and each wave is a plurality of fibers. That is, the fiber is a fundamental parallel processing element in the GPU 140. In one example, the fiber is a constituent of the GPU 140.

Figure 2:
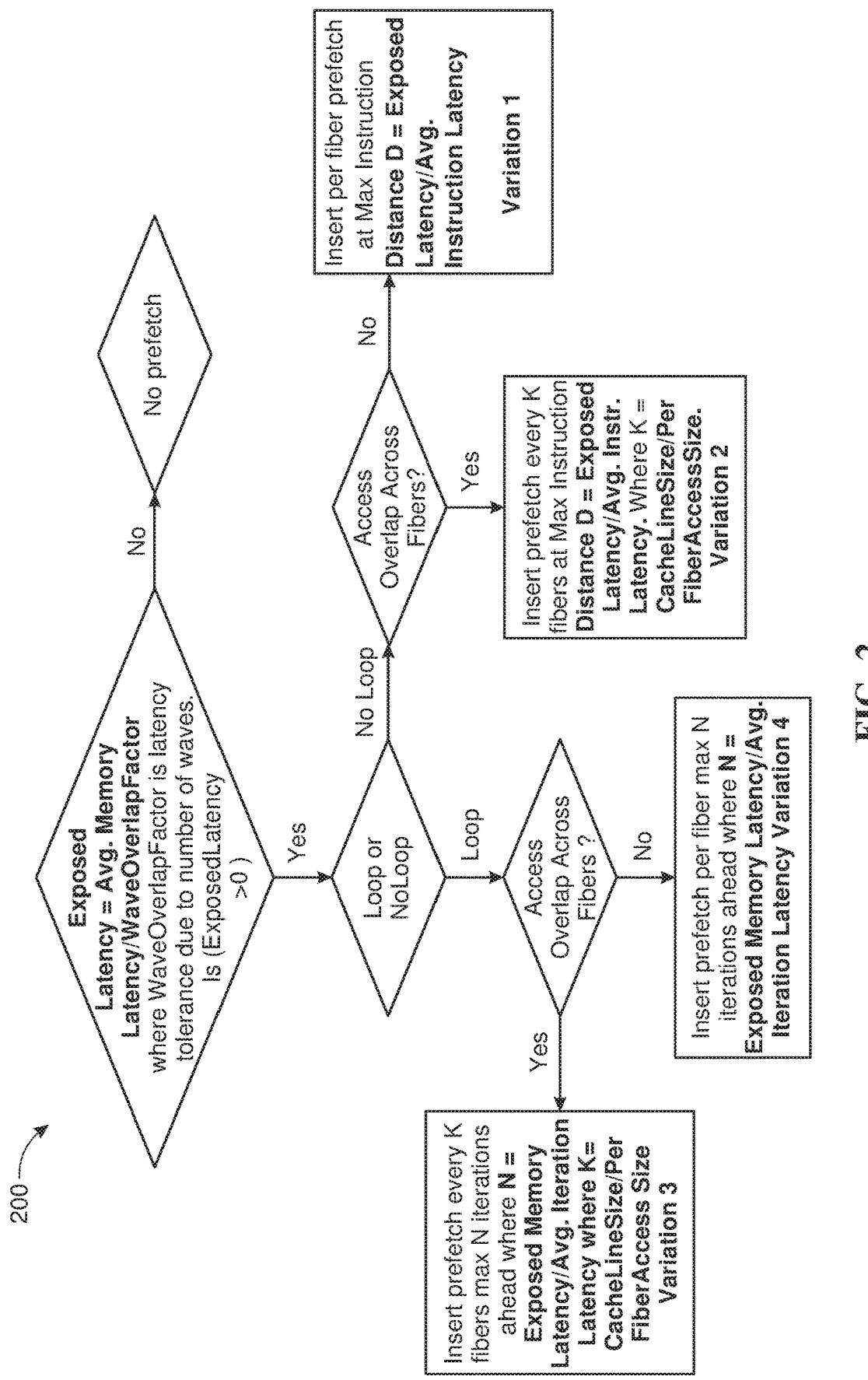
FIG. 2 illustrates an example of a cooperative prefetching process in a compiler for a graphical processing unit (GPU) application.

FIG. 2 illustrates an example of a cooperative prefetching process 200 in a compiler for a graphical processing unit (GPU) application. In one example, cacheline size may be passed on to the compiler in terms of an architecture or device parameter. In one example, wave overlap factor is a parameter which the compiler may determine at different program code portions by performing a program code analysis including an architecture or device parameter. In one example, per fiber access size is a parameter which the compiler may determine from program code analysis. In one example, bandwidth adaptive prefetching may also be performed by the compiler. For example, bandwidth adaptive prefetching may involve a determination if certain program code portions have high memory access traffic demand. In one example, if a high memory access traffic demand is determined, then no prefetches are inserted. This option of bandwidth adaptive prefetching may avoid a performance loss due to limited bandwidth availability.

In one example, a cacheline is an adjacent group of data written or read from a cache memory unit. In one example, cacheline size (in bytes or bits) is an amount of memory occupied by a cacheline. In one example, a wave overlap factor is an amount of latency tolerance due to a number of GPU waves. For example, when a single wave (i.e., a set of fibers/threads executing together) is halted while waiting for memory access, other waves may be scheduled in the interim.

If the memory access latency is N1 cycles and if effective wait time for a particular wave is reduced from N1 to N2 cycles, then the wave overlap factor=N1/N2. That is, expected latency N2=memory access latency/wave overlap factor. In one example, per fiber access size is an amount of data (B bytes) accessed by a given fiber when multiple fibers in a wave are accessing unique adjacent bytes in a cacheline.

In one example, a prefetch distance D is a measure of program code lines between a prefetch instruction and a demand access instruction. In one example, a prefetch instruction is an instruction to retrieve a specific data from main memory and to place the specific data in cache memory. In one example, a demand access instruction is an instruction which requires access to the specified data for execution. For example, the prefetch distance D may be computed as a ratio of an exposed latency parameter to average instruction latency parameter. In one example, the exposed latency parameter may be determined by computing a quotient of an average memory latency value over a wave overlap factor. In one example, the wave overlap factor is defined as a latency tolerance due to a number of waves.

FIG. 3 illustrates an example flow diagram 300 for processor prefetching. In block 310, determine if an exposed latency parameter is greater than zero. If the exposed latency parameter is greater than zero, proceed to block 320. If the exposed latency parameter is not greater than zero (i.e., less than or equal to zero), proceed to block 330.

In block 320, determine if a loop is present in a program code. In one example, the loop is an iteration of program code lines. If the loop is present, proceed to block 340. If the loop is not present, proceed to block 350.

In block 330, execute a GPU application nominally but do not execute a cooperative prefetch.

In block 340, with a loop present, determine if access overlap across fibers is true. If true, proceed to block 360. If false, proceed to block 370.

In block 350, without a loop present, determine if access overlap across fibers is true. If true, proceed to block 380. If false, proceed to block 390.

In block 360, insert prefetch every K fibers with the prefetch issued a maximum of N iterations ahead. In one example, N is equal to exposed latency parameter divided by an average iteration latency parameter. In one example, K is equal to cache line size divided by per fiber access size.

In an example of a program code with a loop present and with access overlap across fibers (i.e., with cooperative prefetching), an original code sequence may have the following example original code flow:

```
For (int i = 0; i < NUM_ITERATIONS; i++)
    { C[i] = A[i] + B[i]; }
```

In an example of a program code with a loop present and with access overlap across fibers (i.e., with cooperative prefetching), a prefetched code sequence may have the following example prefetched code flow (i.e., after prefetch insertion):

```
For (int i = 0; i < N; i++)                          //prologue code
{ If ((fiber_id%K) == 0
{ prefetch A[i]; prefetch B[i]; } }
For (int i = 0; i < (NUM_ITERATIONS – N); i++)   //steady state code
{ //issue prefetches N iterations ahead
If (fiber_ID%K) == 0)
{ prefetch A[i+N]; prefetch B[i+N]; }
C[i] = A[i] + B[i]; }
For (int i = (NUM_ITERATIONS – N); i < NUM_ITERATIONS; i++)
    //epilogue code
{ C[i] = A[i] + B[i]; }
```

That is, the prefetched code flow accesses a unique cache line for both data array A[i] and data array B[i] every K fibers. In one example, adjacent fibers are 4 bytes apart.

In block 370, insert prefetch per fiber with a maximum of N iterations ahead. In one example, N is equal to exposed latency parameter divided by an average iteration latency parameter.

In an example of a program code with a loop present but without access overlap across fibers (i.e., without cooperative prefetching), an original code sequence may have the following example original code flow:

```
For (int i = 0; i < NUM_ITERATIONS; i++)
    { C[i] = A[i] + B[i]; }
```

In an example of a program code with a loop present and without access overlap across fibers (i.e., without cooperative prefetching), a prefetched code sequence may have the following example prefetched code flow (i.e., after prefetch insertion):

```
For (int i = 0; i < N; i++)                          //prologue code
{ prefetch A[i]; prefetch B[i]; }
For (int i = 0; i < (NUM_ITERATIONS – N); i++)   //steady state code
{ //issue prefetches N iterations ahead
prefetch A[i+N]; prefetch B[i+N];
C[i] = A[i] + B[i]; }
For (int i = (NUM_ITERATIONS – N); i < NUM_ITERATIONS; i++)
    //epilogue code
{ C[i] = A[i] + B[i]; }
```

That is, the prefetched code flow accesses a unique cacheline for both data array A[i] and data array B[i] every fiber.

In block 380, insert prefetch every K fibers at a prefetch distance D. In one example, the prefetch distance D is equal to the exposed latency parameter divided by the average instruction latency parameter. In one example, K is equal to cacheline size C divided by per fiber access size S.

In an example of a program code without a loop present but with access overlap across fibers (i.e., with cooperative prefetching), an original code sequence may have the following example original code flow:

```
Inst1
Inst2
Inst3
. . .
InstN
Load Ai       // demand access. Adjacent fibers access
A, A+, A+2S, etc.
```

For the example program code without a loop present but with access overlap across fibers (i.e., with cooperative prefetching), a prefetched code sequence may have the following example prefetched code flow (i.e., after prefetch insertion):

```
Inst1
If(fiber_id%K == 0), Prefetch Ai       if fiber_id is
divisible by integer K
Inst2
Inst3
. . .
InstN
Load Ai       // demand access. Adjacent fibers access
A, A+S, A+2S, etc.
```

That is, the prefetched code flow inserts a prefetch instruction (i.e., Prefetch Ai) after a first instruction Inst1 and prior to a demand access instruction (i.e., Load Ai) if the fiber_id parameter is divisible by integer K, after execution of N instructions. In this example, the prefetch instruction is inserted (N–1) instructions prior to the demand access instruction. That is, the prefetch distance D is equal to (N–1).

In block 390, insert per fiber prefetch at a prefetch distance D. In one example, the prefetch distance D is equal to the exposed latency parameter divided by the average instruction latency parameter. In one example, the prefetch distance D is based on the exposed latency parameter and on a latency to execute different instructions between a prefetch instruction and a demand access instruction.

In an example of a program code without a loop present and without access overlap across fibers, an original code sequence may have the following example original code flow:

```
Inst1
Inst2
Inst3
. . .
InstN
Load A       // demand access
```

In an example of a program code without a loop present and without access overlap across fibers, a prefetched code sequence may have the following example prefetched code flow (i.e., after prefetch insertion):

```
Inst1
Prefetch A
Inst2
Inst3
. . .
InstN
Load A       // demand access
```

That is, the prefetched code flow inserts a prefetch instruction (i.e., Prefetch A) after a first instruction Inst1 and prior to a demand access instruction (i.e., Load A) after execution of N instructions. In this example, the prefetch instruction is inserted (N−1) instructions prior to the demand access instruction. That is, the prefetch distance D is equal to (N−1).

Figure 4:
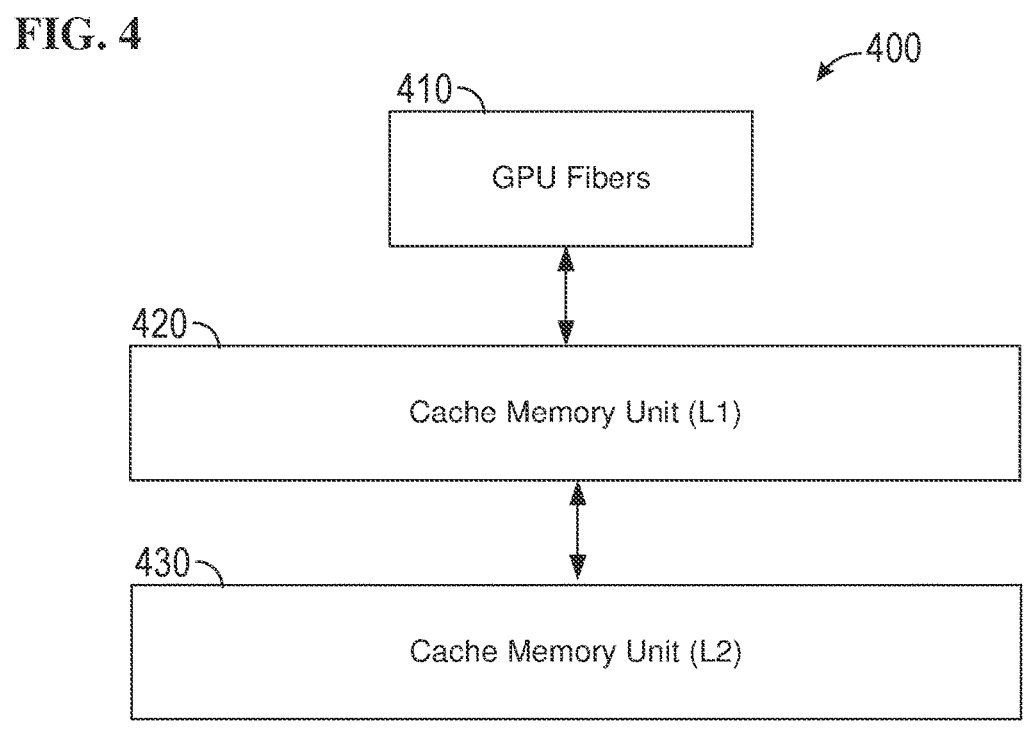
FIG. 4 illustrates an example of a graphical processing unit (GPU) prefetch operation for a GPU with a plurality of GPU fibers.

FIG. 4 illustrates an example 400 of a graphical processing unit (GPU) prefetch operation for a GPU with a plurality of GPU fibers. In one example, the plurality of GPU fibers 410 is connected to a layer 1 (L1) cache memory unit 420 which is in turn connected to a layer 2 (L2) cache memory unit 430. In one example, each GPU fiber of the plurality of GPU fibers 410 may store data in M adjacent unique bytes of the L1 cache memory unit 420. For example, each GPU fiber may store (e.g., write) data in four (i.e., M=4) adjacent unique bytes of the L1 cache memory unit 420. In one example, a quantity N of GPU fibers (e.g., N=16 GPU fibers) may store data to one cacheline L of size M*N bytes. For example, the cacheline may be part of the L1 cache memory unit 420. In one example, a first fiber of the quantity N of GPU fibers may prefetch a cacheline which other fibers (e.g., the second fiber through Nth fibers) of the quantity of N of GPU fibers may reuse. For example, the GPU prefetch operation may be part of a SIMT programming model.

Figure 5:
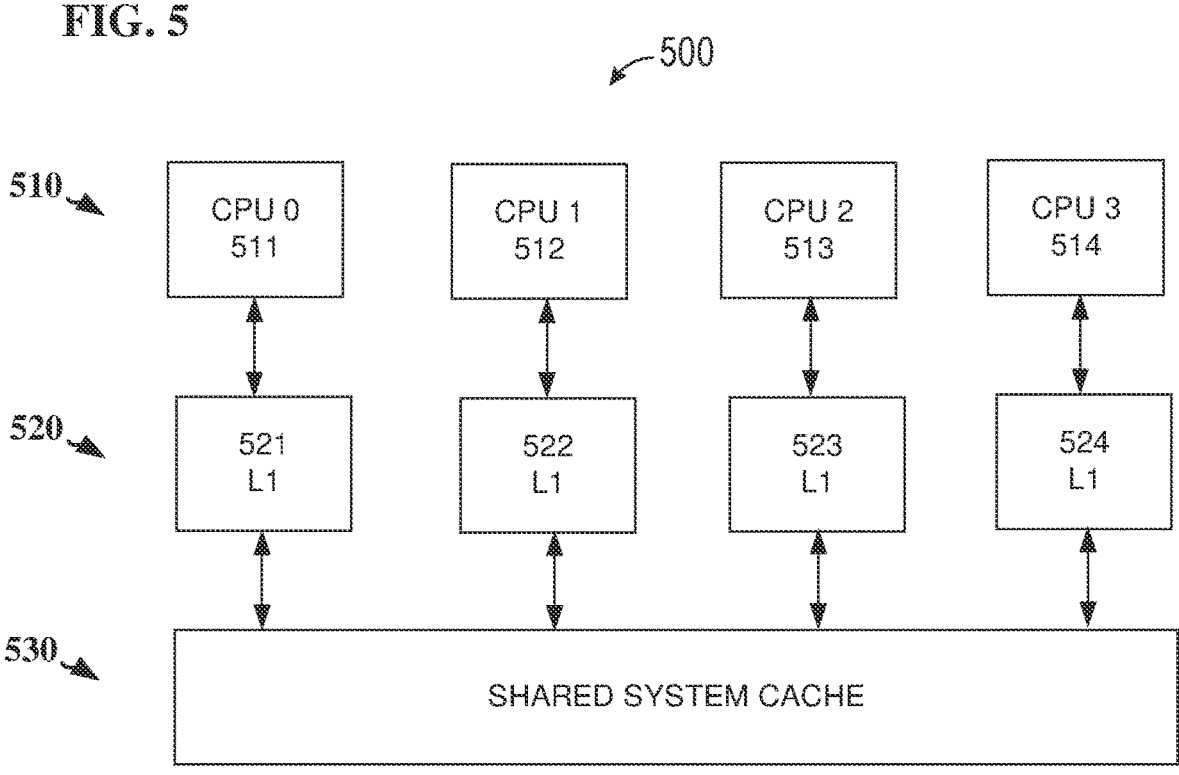
FIG. 5 illustrates an example of a central processing unit (CPU) prefetch operation for a CPU with a plurality of CPU cores.

FIG. 5 illustrates an example 500 of a central processing unit (CPU) prefetch operation for a CPU with a plurality of CPU cores. In one example, the plurality of CPU cores 510 includes a first CPU (CPU0) 511, a second CPU (CPU1) 512, a third CPU (CPU2) 513 and a fourth CPU (CPU3) 514. In one example, the plurality of CPU cores 510 is connected to a plurality of L1 cache memory units. In one example, the first CPU 511 is connected to a first L1 cache memory unit 521, the second CPU 512 is connected to a second L1 cache memory unit 522, the third CPU 513 is connected to a third L1 cache memory unit 523 and the fourth CPU 514 is connected to a fourth L1 cache memory unit 524.

In one example, the first CPU 511 may execute a first thread which access a first group of adjacent bytes in the first L1 cache memory unit 521. In one example, the second CPU 512 may execute a second thread which accesses a second group of adjacent bytes in the second L1 cache memory unit 522. In one example, the first group of adjacent bytes and the second group of adjacent bytes are on a same cacheline L. In one example, a cacheline is an adjacent group of data written or read from a cache memory unit. In one example, the first thread may prefetch the first group of adjacent bytes and the second thread may next prefetch the second group of adjacent bytes. In one example, the first thread may next store the first group of adjacent bytes and the second thread may next store the second group of adjacent bytes. In one example, when the first thread stores the first group of adjacent bytes, the same cacheline L resides in the second L1 cache memory unit 522 which may result in degraded performance (i.e., a cache miss). In one example, the CPU prefetch operation is part of a MIMD programming model.

In one example, the degraded performance is due to false sharing between the first L1 cache memory unit 521 and the second L1 cache memory unit 522 (i.e., the cacheline transitions between the first L1 cache memory unit 521 and the second L1 cache memory unit 522).

In one example, an example of a program code with multiple cache levels is as follows:

| For (int i = 0; i < N1; i++) | {C[i] = A[i] + B[i];} | first loop |
| For (int j = 0; j < N2; j++) | {D[j] = A[j] − B[j];} | second loop |
| N2 < N1 | | |

In the program code, the notation i++ means to increment integer index i by one and the notation j++ means to increment integer index j by one. The notation A[i] refers to a first data array indexed by i, the notation B[i] refers to a second data array indexed by i, the notation C [i] refers to a third data array indexed by i and the notation D [i] refers to a fourth data array indexed by i. The parameters N1 and N2 are positive integer parameters where N2<N1.

In one example, execution of the first loop of the above program code example may encounter a cache miss, since the requested data A[i] and B[i] are not initially stored in a cache memory unit. For example, average memory latency of the first loop of the above program code example will be due to main memory (e.g., random access memory (RAM)) latency.

In one example, execution of the second loop of the above program code example may encounter a cache hit, since the requested data A[j] and B[j] fit within the L1 cache memory unit 420. In one example, execution of the second loop of the above program code example may retrieve the prefetch the requested data A[j] and B[j] from the L2 cache memory unit 430 if the requested data A[j] and B[j] fit within the L2 cache memory unit 430. In one example, a prefetch distance D may change for the second loop since the memory latency of the L2 cache memory unit 430 is less than the memory latency of the main memory. In one example, prefetching may not be required depending on the wave overlap factor, which may be determined by the compiler. In one example, if the requested data A[j] and B[j] does not fit in the L1 cache memory 420 and L2 cache memory 430, then performance of the second loop may be similar to performance of the first loop. In one example, the prefetch distance D may be calculated by the compiler.

In one example, if a quantity of memory accesses in a loop of the program code is greater than a first threshold such that the requested data does not fit into any cache memory unit, then there is no utility in inserting a prefetch since the requested data may be replaced by other data by the time the requested data is ready for execution. In one example, the compiler may determine when the requested data does not fit into any cache memory unit.

In one example, an example of a program code with nested loops is as follows:

| For (int i = 0; i < N1; i++) | outer loop |
| {For (int j = 0; j < N2; j++) | inner loop |
| {C[i][j] = A[i][j] + B[i][j];} | |
| D[i] = C[i][0] + C[i][1];} | |

In one example, execution of the inner loop of the above nested loop program code example may encounter a cache miss, since the requested data A[i][j] and B[i][j] are not initially stored in a cache memory unit. In one example, average memory latency of the inner loop of the above nested loop program code example may be due to main memory (e.g., random access memory (RAM)) latency.

In one example, execution of the outer loop may employ temporal locality without need for prefetch since the requested data C [i][0] and C [i][1] may be stored in the cache memory unit if the integer N2 is less than a second threshold such that the inner loop does not completely flush the cache memory unit. In one example, the compiler may determine if the inner loop does not flush the cache memory unit.

In one example, an execution of a program code without a loop present and without access overlap across fibers may employ processor prefetching. In one example, execution of a 3×3 convolution kernel may have each fiber loading N consecutive bytes from global memory into registers. For example, N=32 bytes, for a total of 8×32-bit floating point values. In one example, a distance A between a global memory load start address for two adjacent fibers (e.g., fiber id 0 and fiber id 1) may be greater than a cacheline size of B bytes. For example, distance A=2304 bytes and cacheline size B=64 bytes, so A>B. In one example, the global memory load start address for two adjacent fibers would fall in different cachelines. In one example, a per-fiber prefetch of 32 bytes may be inserted into a first example program code without a loop present and without access overlap across fibers as illustrated in FIG. 6 (e.g., see line 24). FIG. 6 illustrates a first example 600 of a program code without a loop present and without access overlap across fibers. In one example, this per-fiber prefetch of 32 bytes improves performance by approximately 5%.

In one example, an execution of a program code without a loop present and with access overlap across fibers may employ processor prefetching. In one example, execution of a fast Fourier transform (FFT) kernel may have each fiber loading N consecutive bytes (e.g., N=8 consecutive bytes or 2×32 bit floating point values) from global memory into registers. In one example, a distance A between a global memory load start address for two adjacent fibers (e.g., fiber id 0 and fiber id 1) may be less than a cacheline size of B bytes. For example, distance A=8 bytes and cacheline size B=64 bytes, so A<B. In one example, the global memory load start address for two adjacent fibers would fall in the same cachelines (i.e., there is overlap). In one example, a prefetch of 64 bytes (e.g., 1 cacheline) may be inserted once per 8 fibers into a second example program code without a loop present and with access overlap across fibers as illustrated in FIG. 7 (e.g., see lines 61-62). FIG. 7 illustrates a second example 700 of a program code without a loop present and with access overlap across fibers. In one example, this fiber prefetch of 64 bytes improves performance by approximately 3.4%.

In one example, the second example program code of FIG. 7 may be modified by removing a conditional check at one line (e.g., line 61 of FIG. 7) to allow all fibers to participate in the prefetch request. In one example, with this modified kernel an average performance loss of approximately 45% is incurred because of excess bandwidth consumption due to unnecessary prefetches.

In one example, an execution of a program code with a loop present and with access overlap across fibers may employ processor prefetching. In one example, execution of a general matrix multiply (GEMM) kernel may have each fiber loading N consecutive bytes (e.g., N=4 consecutive bytes or 1×32 bit floating point value) from global memory into registers. In one example, a distance A between a global memory load start address for two adjacent fibers (e.g., fiber id 0 and fiber id 1) may be less than a cacheline size of B bytes. For example, distance A=4 bytes and cacheline size B=64 bytes, so A<B. In one example, the global memory load start address for two adjacent fibers would fall in the same cachelines (i.e., there is overlap). In one example, a prefetch of 64 bytes (e.g., 1 cacheline) may be inserted once per 16 fibers and one loop iteration ahead of demand access into a third example program code with a loop present and with access overlap across fibers as illustrated in FIG. 8 (e.g., see lines 174-175). FIG. 8 illustrates a third example 800 of a program code with a loop present and with access overlap across fibers. In one example, this prefetch of 64 bytes once per 16 fibers improves average performance by approximately 2.2% and maximum performance by approximately 93% in about half of the kernel variations in one example basic linear algebra software package.

In one example, the third example program code of FIG. 8 may be modified by removing a conditional check at one line (e.g., line 175 of FIG. 8) to allow all fibers to participate in the prefetch request. In one example, with this modified kernel an average performance loss of approximately 22% and a maximum performance loss of approximately 600% is incurred because of excess bandwidth consumption due to unnecessary prefetches.

In one aspect, one or more of the steps for processor prefetching in FIGS. 2 & 3 may be executed by one or more processors which may include hardware, software, firmware, etc. The one or more processors, for example, may be used to execute software or firmware needed to perform the steps in the flow diagrams of FIGS. 2 & 3. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B. and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a layer 1 (L1) cache memory unit;
a layer 2 (L2) cache memory unit coupled to the layer 1 (L1) cache memory unit, wherein the layer 2 (L2) cache memory unit has a slower memory access and a larger memory capacity than the layer 1 (L1) cache memory unit;
a graphical processing unit (GPU) coupled to the layer 1 (L1) cache memory unit and the layer 2 (L2) cache memory unit, the GPU configured to perform the following:
  a) determine if an exposed latency parameter is greater than zero;
  b) determine if a loop is present in a program code; and
  c) determine if access overlap across fibers is true; and
  wherein the GPU is further configured to execute a prefetch instruction every quantity K fibers of at least one cache line size at a prefetch distance D, or wherein the GPU is further configured to execute a prefetch instruction every K fibers with a maximum of quantity N iterations to reduce memory latency.

2. The apparatus of claim 1, wherein the quantity N is equal to an exposed latency parameter divided by an average iteration latency parameter, and the quantity K is equal to a cache line size divided by a per fiber access size.

3. A method comprising:
determining if an exposed latency parameter is greater than zero;
determining that a loop is present in a program code;
determining that the exposed latency parameter is greater than zero;
determining that access overlap across fibers is true; and
executing a prefetch instruction every quantity K fibers of at least one cache line size at a prefetch distance D with a maximum of quantity N iterations to reduce memory latency.

4. The method of claim 3, wherein the quantity N is equal to an exposed latency parameter divided by an average iteration latency parameter.

5. The method of claim 3, wherein the quantity K is equal to a cache line size divided by a per fiber access size.

6. A method comprising:
determining that a loop is not present in a program code;
determining that an exposed latency parameter is greater than zero;
determining that access overlap across fibers is true; and
a prefetch instruction every quantity K fibers of at least one cache line size at a prefetch distance D or executing a prefetch instruction per fiber of at least one cache line size at a prefetch distance D to reduce memory latency.

7. The method of claim 6, wherein the prefetch distance D is equal to an exposed latency parameter divided by an average instruction latency parameter.

8. The method of claim 7, wherein the quantity K is equal to a cache line size divided by a per fiber access size.

9. A non-transitory computer-readable medium storing computer executable code, operable on a device comprising at least one processor and at least one memory coupled to the at least one processor, wherein the at least one processor is configured to implement a processor prefetching, the computer executable code comprising:

instructions for causing a computer to determine if an exposed latency parameter is greater than zero;

instructions for causing the computer to determine if a loop is present in a program code;

instructions for causing the computer to determine if access overlap across fibers is true; and instructions for causing the computer to perform one of the following:

a) execute a prefetch instruction every quantity K fibers at a prefetch distance D wherein, the prefetch distance D is equal to an exposed latency parameter divided by an average instruction latency parameter and the quantity K is equal to a cache line size divided by a per fiber access size;

b) execute a prefetch instruction every quantity K fibers with a maximum of quantity N iterations, wherein the quantity N is equal to an exposed latency parameter divided by an average iteration latency parameter, and the quantity K is equal to a cache line size divided by a per fiber access size; or c) execute a prefetch per fiber with a maximum of quantity N iterations ahead, wherein the quantity N is equal to an exposed latency parameter divided by the average iteration latency parameter to reduce memory latency.

* * * * *